(12) United States Patent
Jindo et al.

(10) Patent No.: US 6,665,603 B2
(45) Date of Patent: Dec. 16, 2003

(54) VEHICLE TRAVELING CONTROL SYSTEM

(75) Inventors: Tomio Jindo, Yokohama (JP); Youji Shimizu, Yokohama (JP); Kiyomi Hirasago, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 15 days.

(21) Appl. No.: 09/996,610

(22) Filed: Nov. 30, 2001

(65) Prior Publication Data

US 2002/0087255 A1 Jul. 4, 2002

(30) Foreign Application Priority Data

Dec. 28, 2000 (JP) .......................... 2000-401668

(51) Int. Cl.$^7$ .............................. G05D 1/00; G06F 17/00
(52) U.S. Cl. .............................. 701/96; 701/93; 701/41; 701/301; 180/170; 340/903; 340/435; 340/436
(58) Field of Search .......................... 701/96, 93, 300, 701/301, 41, 36, 28, 117; 180/443, 168, 170; 340/903, 436, 901, 905, 936, 937, 435

(56) References Cited

U.S. PATENT DOCUMENTS

| | | | | |
|---|---|---|---|---|
| 5,572,449 A | * | 11/1996 | Tang et al. ................... | 700/304 |
| 5,854,987 A | * | 12/1998 | Sekine et al. .................. | 701/41 |
| 5,878,361 A | | 3/1999 | Sekine et al. .................. | 701/41 |
| 5,928,299 A | * | 7/1999 | Sekine et al. .................. | 701/41 |
| 6,332,108 B1 | * | 12/2001 | Hirasago ....................... | 701/93 |
| 6,473,678 B1 | * | 10/2002 | Satoh et al. ................... | 701/41 |
| 6,487,501 B1 | * | 11/2002 | Jeon ........................... | 701/301 |
| 6,493,619 B2 | * | 12/2002 | Kawazoe et al. ............. | 701/41 |
| 2002/0013647 A1 | * | 1/2002 | Kawazoe et al. ............. | 701/41 |

FOREIGN PATENT DOCUMENTS

| JP | 8-263791 | | 10/1996 | |
|---|---|---|---|---|
| JP | 10044826 A | * | 2/1998 | ........... B60K/31/00 |
| JP | 2001273588 A | * | 10/2001 | ............ G08G/1/00 |

* cited by examiner

*Primary Examiner*—Jacques H. Louis-Jacques
(74) *Attorney, Agent, or Firm*—Foley & Lardner (57) ABSTRACT

A vehicle traveling control system is comprised of a following controller and a lane-keeping controller. The following controller controls an inter-vehicle distance between a host vehicle and a following object ahead of the host vehicle by controlling a vehicle speed on the basis of a detected inter-vehicle distance. The lane-keeping controller controls a steering control of the host vehicle so as to locate the host vehicle within a lane traveled by the host vehicle. A control condition of one of the following control and the steering control is changed according to the control condition of the other of the following control and the steering control.

12 Claims, 11 Drawing Sheets

VEHICLE TRAVELING CONTROL SYSTEM

BACKGROUND OF THE INVENTION

The present invention relates to a vehicle traveling control system which is arranged to execute a traveling speed control for controlling a vehicle speed to follow a preceding vehicle or obstacle and a traveling direction control including a lane-keeping control.

Japanese Patent Provisional Publication No. 8-263791 discloses a vehicle traveling control system employing a following control and a lane-keeping control.

SUMMARY OF THE INVENTION

However, this vehicle traveling control system yet has a problem to be improved.

It is therefore an object of the present invention to provide a vehicle traveling control system which is capable of suitably executing a traveling speed control and a steering control according to a vehicle traveling condition.

An aspect of the present invention resides in a vehicle traveling control system of a host vehicle comprising a following controller and a lane-keeping controller. The following controller executes a following control for controlling an inter-vehicle distance between the host vehicle and a following object ahead of the host vehicle. The lane-keeping controller is coupled with the following controller, and executes a steering control for steering the host vehicle so as to locate the host vehicle within a lane traveled by the host vehicle. A control condition of one of the following control and the steering control is changed according to the control condition of the other of the following control and the steering control.

Another aspect of the present invention resides in a method of controlling a traveling of a host vehicle which method comprises a step of executing a following control for controlling an inter-vehicle distance between the host vehicle and a following object ahead of the host vehicle; a step of executing a steering control for steering the host vehicle so as to locate the host vehicle within a lane traveled by the host vehicle; and a step of changing a control condition of one of the following control and the steering control according to the control condition of the other of the following control and the steering control.

DETAILED DESCRIPTION OF THE INVENTION

Referring to FIGS. 1 to 4, there is shown a first embodiment of a vehicle traveling control system according to the present invention.

Figure 1:
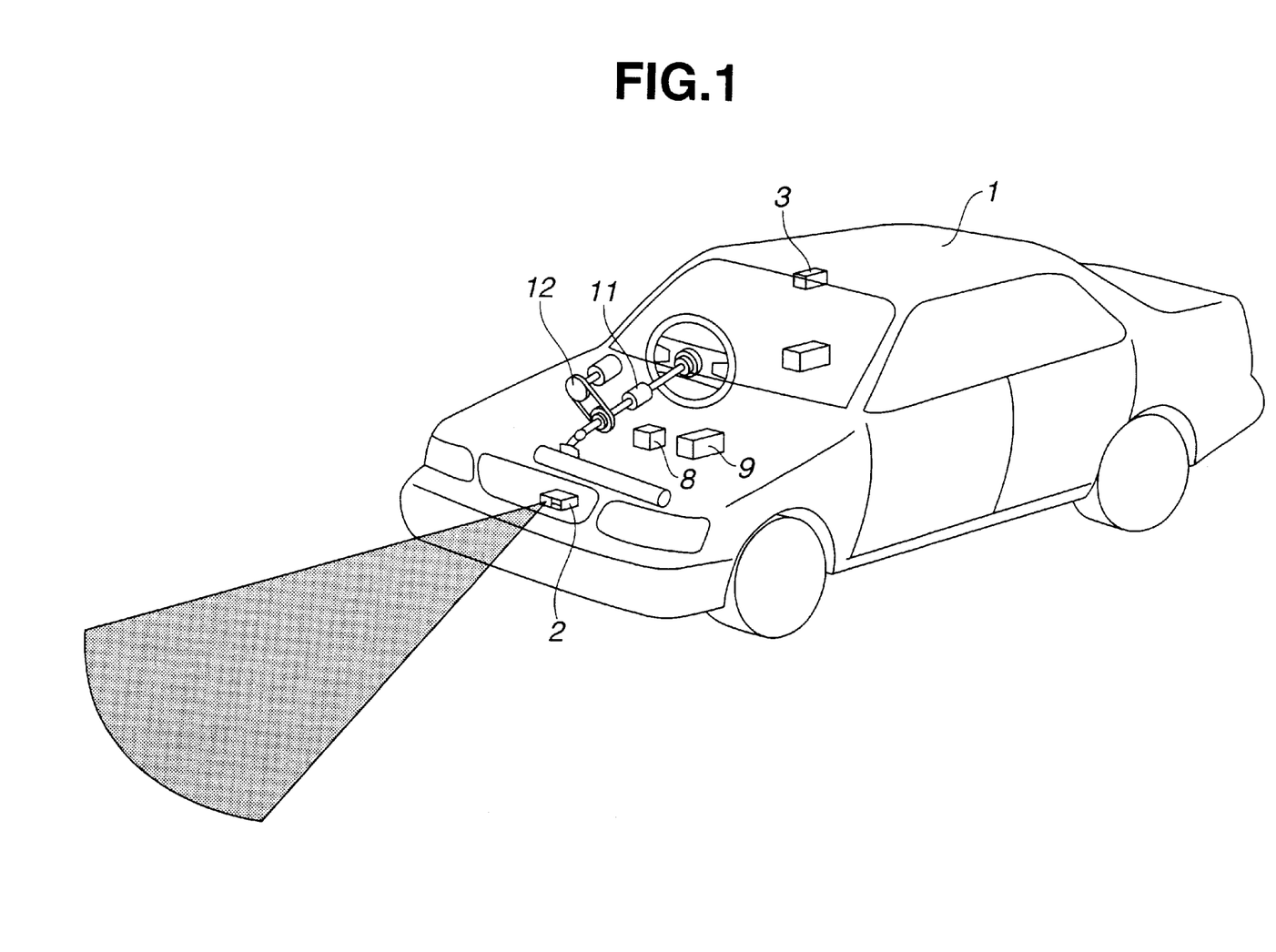
FIG. 1 is a perspective view of a vehicle equipped with a vehicle traveling control system according to the present invention.
Figure 2:
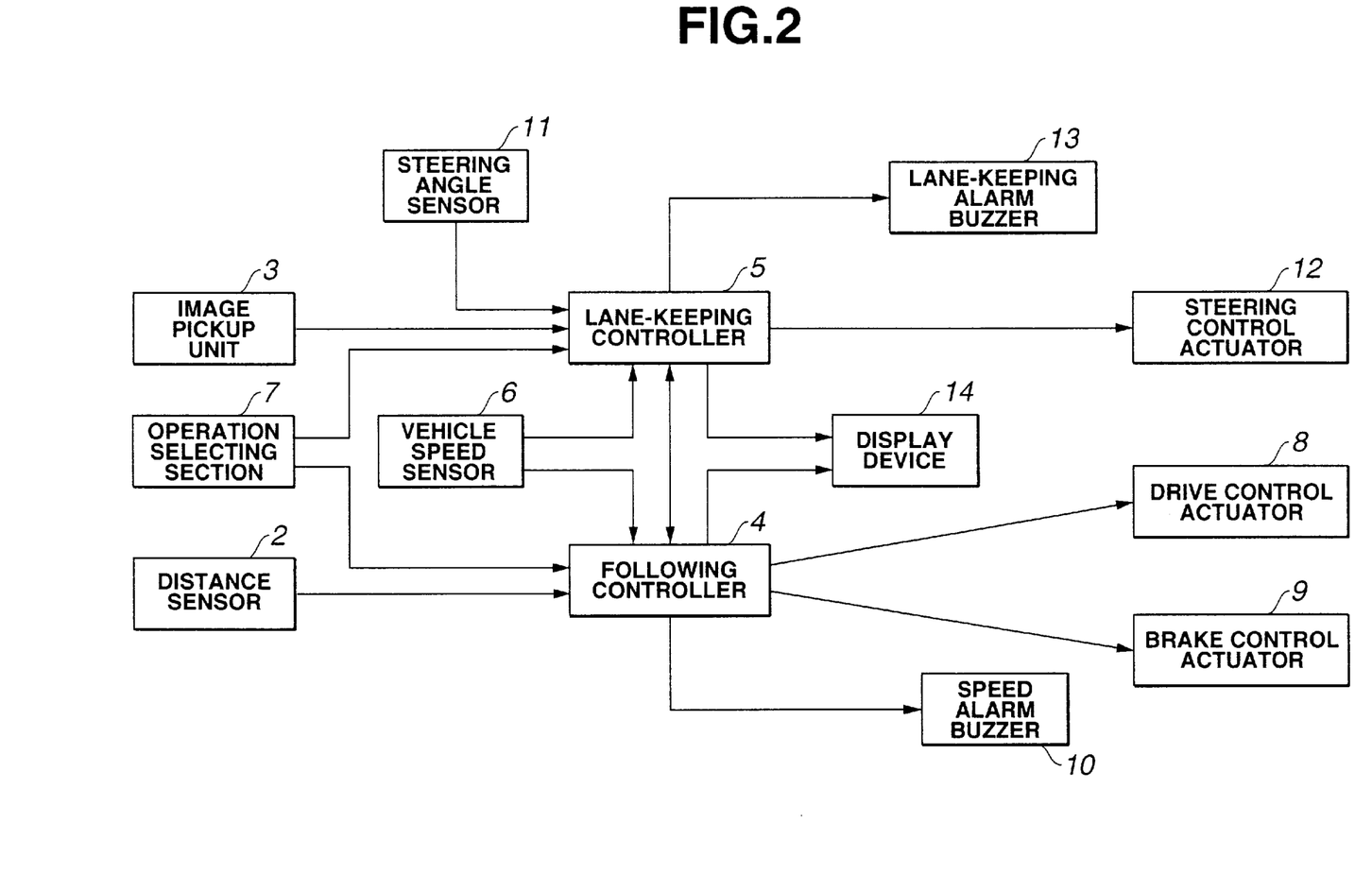
FIG. 2 is a block view showing a control system of a first embodiment of the vehicle travel control system according to the present invention.

As shown in FIGS. 1 and 2, the vehicle traveling control system according to the present invention is installed to a host vehicle 1 and comprises a following controller 4 for executing a following control relative to a preceding vehicle or object and a lane-keeping controller 5 for executing a lane-keeping control including a steering control of host vehicle 1.

A distance sensor 2 is installed at a front and center portion of host vehicle 1. Distance sensor 2 includes a millimeter wave radar and a laser radar which measure an inter-vehicle distance between host vehicle 1 and a preceding vehicle traveling ahead of host vehicle 1 or an controlled object including an obstacle. Further, an image pickup unit 3 is installed at a laterally center portion near a front window glass and in a passenger compartment of host vehicle 1. Image pickup unit 3 includes a CCD camera which picks up an image of a road ahead of host vehicle 1.

Distance sensor 2 outputs an inter-vehicle distance detection value D indicative of the inter-vehicle distance to following controller 4. Image pickup unit 3 outputs image information indicative of the road image to a lane-keeping controller 5.

A vehicle speed sensor 6 detects a speed of host vehicle 1 and outputs a vehicle speed detection value V indicative of the speed of host vehicle 1 to following controller 4 and lane-keeping controller 5.

Start and end of the following control and the lane-keeping control and setting of a target speed of host vehicle 1 are executed by operating an operation selecting section 7. Operation selecting section 7 outputs signals indicative of the setting and selecting condition of the set target speed and the start and end selecting condition of the following control and the lane-keeping control to following controller 4 and lane-keeping controller 5. Further, following controller 4 and lane-keeping controller 5 are communicated with each other so as to exchange alarm signals therebetween.

Further, there are provided a drive control actuator 8 such as a throttle valve actuator for controlling a driving force, a brake control actuator 9 such as a brake booster for controlling braking force, and a speed alarm buzzer 10 for generating alarm when host vehicle 1 is put in a deceleration limit control condition indicative that following controller 4 is unable to maintain an aimed following operation. Drive control actuator 8, brake control actuator 9 and speed alarm buzzer 10 are connected to following controller 4 and lane-keeping controller 5.

A steering angle sensor 11 detects a steering angle of front wheels and outputs a steering angle detection value θ to lane-keeping controller 5. A steering control actuator 12 is connected to lane-keeping controller 5 and generates a steering assist force according to a command signal from lane-keeping controller 5. A lane-keeping alarm buzzer 13 is connected to lane-keeping controller 5 and generates lane-keeping alarm different from the speed alarm of speed alarm buzzer 10 in frequency and tone when receiving an alarm command signal from lane-keeping controller 5. The lane-keeping alarm is generated when there is a tendency that a rate of change of host vehicle 1 relative to a lane increases.

Following controller 4 and lane-keeping controller 5 output display information to a display device (liquid-crystal display) 14 to inform necessary information to a driver.

Figure 3:
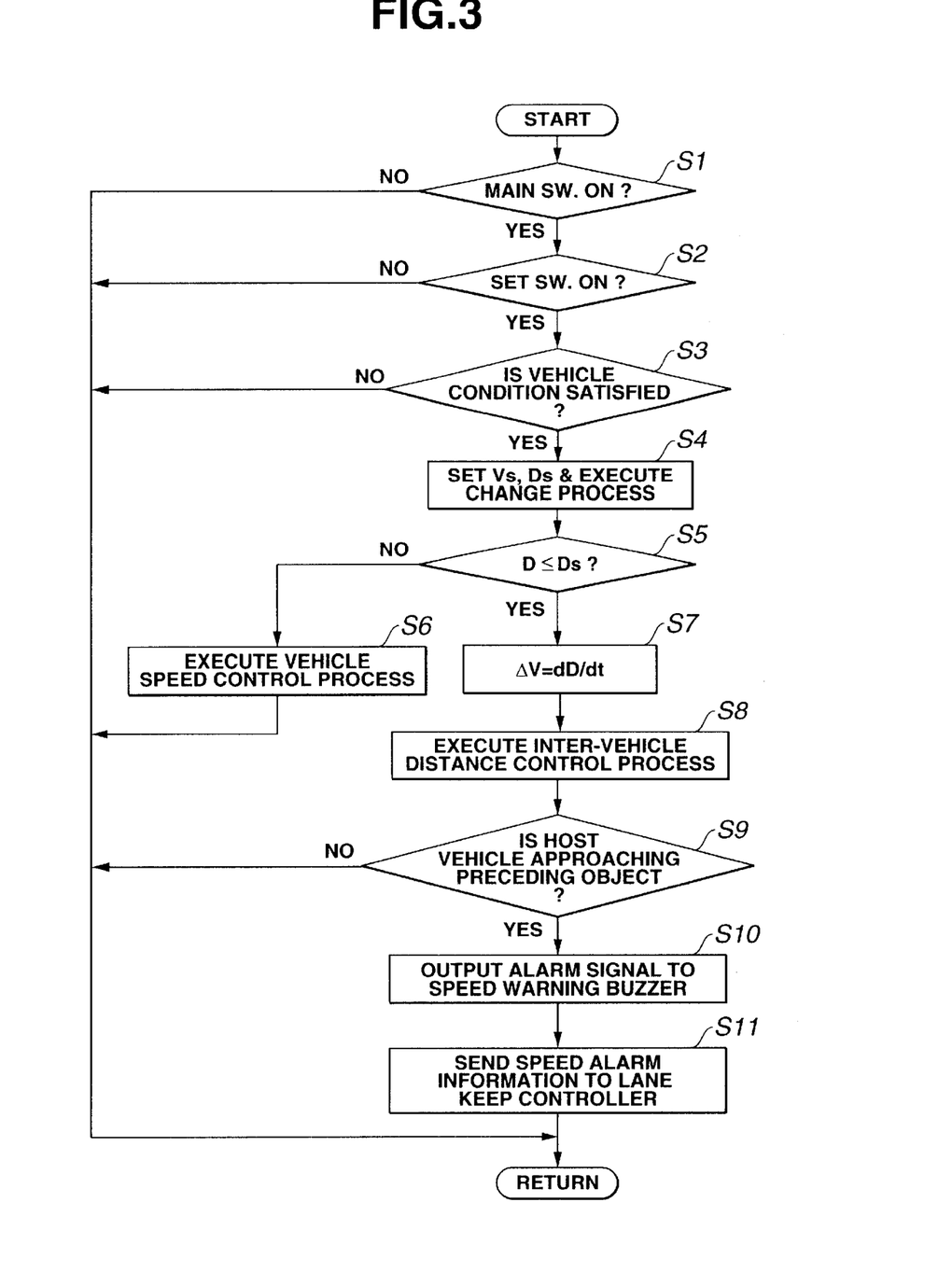
FIG. 3 is a flowchart showing a following control process executed by a following controller of the first embodiment.

Following controller 4 executes a following control on the basis of a flowchart shown in FIG. 3. The following control is an interruption process of a main control and is executed at predetermined intervals, such as 10 msec. intervals.

At step S1, following controller 4 determines on the basis of the signal from operation selecting section 7 whether or not a main switch of the following control is turned on. When the determination at step S1 is negative, that is, when the main switch for the following control is turned off, this routine jumps to a return step to terminate the present interruption process and to return to the main routine. When the determination at step S1 is affirmative, the routine proceeds to step S2.

At step S2, following controller 4 determines on the basis of the signal from operation selecting section 7 whether or not the set switches for setting conditions of the following control and the lane-keeping control and for setting the target speed of host vehicle 1. When the determination at step S2 is negative, that is, when the set switches are turned off, this routine jumps to the return step to terminate the present interruption process and to return to the main routine. When the determination at step S2 is affirmative, the routine proceeds to step S3.

At step S3, following controller 4 reads vehicle speed detection value V and determines whether or not a vehicle condition necessary for starting the preset following control is satisfied. When the determination at step S3 is negative, this routine jumps to the return step to terminate the present interruption process and to return to the main routine. Following controller 4 checks the conditions as to whether or not vehicle speed detection value V is greater than or equal to a predetermined speed, whether or not the brake is not operated, and whether or not a shift lever is set at D range, as the vehicle condition.

At step S4 subsequent to the affirmative determination at step S3, following controller 4 executes a processing for setting and/or changing a set vehicle speed Vs and a set inter-vehicle distance Ds.

At step S5, following controller 4 reads inter-vehicle distance detection value D from distance sensor 2 and determines whether or not inter-vehicle distance detection value D is smaller than or equal to the set inter-vehicle distance Ds. That is, controller 4 determines whether there is a preceding vehicle or a controlled object such as an obstacle on the road ahead of host vehicle 1. When the determination at step S5 is negative (D>Ds), that is, when it is determined that there is no controlled object ahead of host vehicle 1, the routine proceeds to step S6. When the determination at step S5 is affirmative (D<Ds), the routine proceeds to step S7.

At step S6 subsequent to the negative determination at step S5, following controller 4 executes the vehicle speed control. More specifically, following controller 4 controls-drive control actuator 8 to maintain vehicle speed detection value V at a target vehicle speed V*. Thereafter, following controller 4 terminates the present timer interruption process, and the routine returns to the main programs.

At step S7 subsequent to the affirmative determination at step S6, following controller 4 calculates a relative speed $\Delta V$ by differentiating inter-vehicle distance detection value V measured by distance sensor 2.

At step S8, following controller 4 executes the inter-vehicle distance control. More specifically, following controller 4 calculates a target vehicle speed V* for bringing inter-vehicle distance D closer to target inter-vehicle distance D*, on the basis of inter-vehicle distance D and relative speed $\Delta V$. Further, following controller 4 controls drive control actuator 8 and brake control actuator 9 to bring inter-vehicle distance D closer to target inter-vehicle distance D* so as to maintain vehicle-speed detection value V at target vehicle speed V*. That is, following controller 4 executes the acceleration and deceleration control and the inter-vehicle distance control.

At step S9, following controller 4 reads inter-vehicle distance D and relative speed $\Delta V$, and determines on the basis of these inter-vehicle distance D and relative speed $\Delta V$ whether or not inter-vehicle distance D is smaller than or equal to the present inter-vehicle distance Dss, or whether or not relative speed $\Delta V$ is greater than or equal to a preset relative speed $\Delta Vs$. By this determination, it is determined whether or not host vehicle 1 is approaching a following control object. When it is determined at step S9 that host vehicle 1 is not approaching the following control object, the present timer interruption processing is terminated. When it is determined at step S9 that host vehicle 1 is approaching the following control object, the routine proceeds to step S10.

At step S10, following controller 4 outputs an alarm signal to speed alarm buzzer 10 so that speed alarm buzzer 10 generates the speed alarm.

At step S11, following controller 4 sends the speed alarm information representative of generating the speed alarm to lane-keeping controller 5. Then, the routine proceeds to the return block to terminate the present timer interruption process and to return to the main program.

Figure 4:
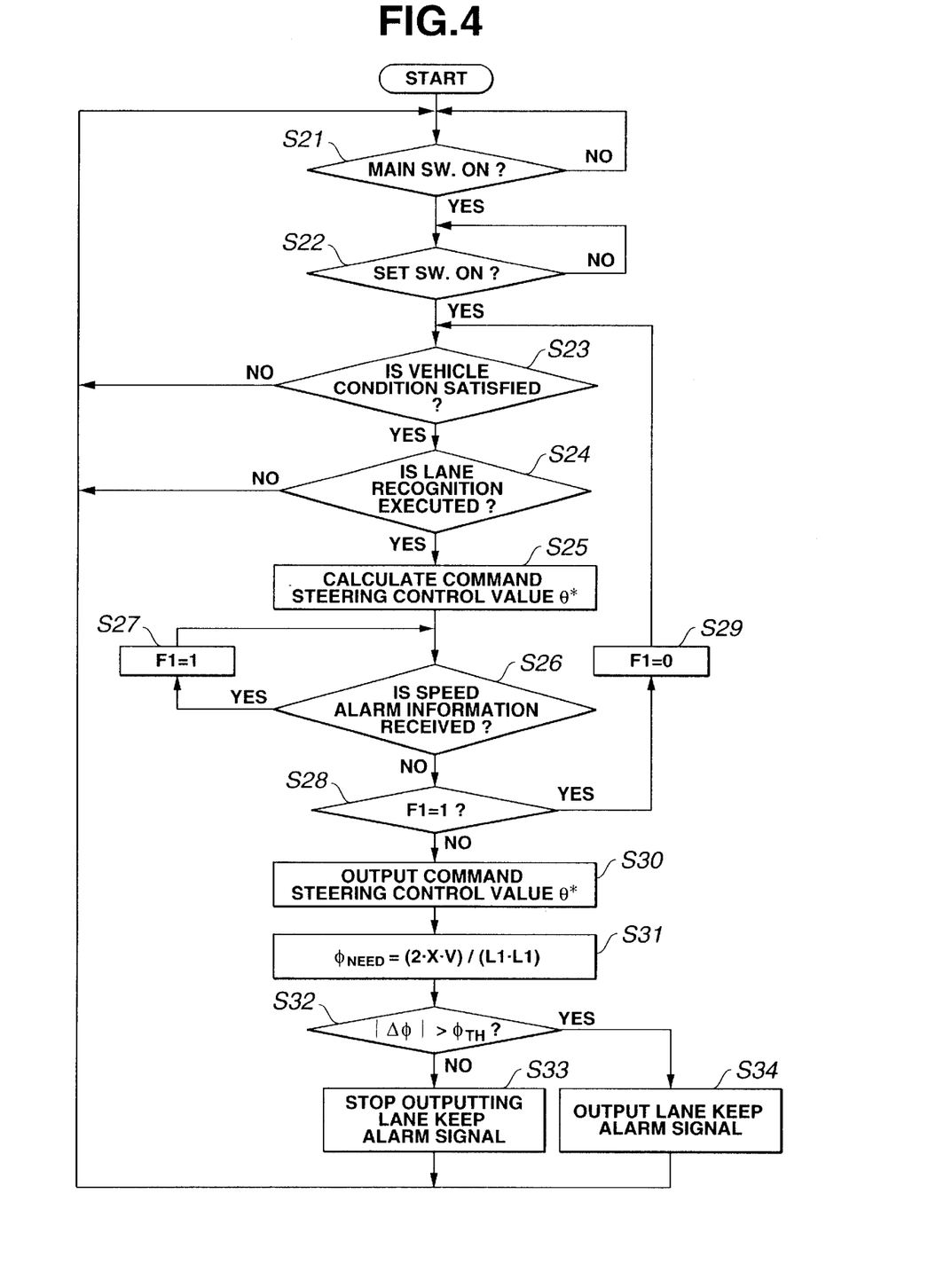
FIG. 4 is a flowchart showing a lane-keeping control process executed by a lane-keeping controller of the first embodiment.

On the other hand, lane-keeping controller 5 executes the lane-keeping control process shown in FIG. 4.

At step S21, lane-keeping controller 5 determines whether or not the following-control main switch provided in operation selecting section 7 is turned on. When the determination at step S21 is negative, the routine repeats step S21. That is, until the following-control main switch is turned on, lane-keeping controller 5 is on standby. When the following-controller main switch is turned on, the routine proceeds to step S22.

At step S22, lane-keeping controller 5 determines whether or not the set switch for setting the condition of the lane-keeping control is turned on. When the determination at step S22 is negative, the routine repeats step S22. That is, until-the set switch is turned on, lane-keeping controller 5 is on standby. When the set switch is turned on, the routine proceeds to step S23.

At step S23, lane-keeping controller 5 reads vehicle speed detection value V and the like, and determines whether or not a vehicle condition necessary for starting the following control is satisfied. When the determination at step S23 is negative, the routine returns to step S21. When the determination at step S23 is affirmative, the routine proceeds to step S24. Lane-keeping controller 5 checks the conditions as to whether or not vehicle speed detection value V is greater than or equal to a predetermined speed, whether or not the brake is not operated, and whether or not a shift lever is set at D range, as the vehicle condition.

At step S24, lane-keeping controller 5 reads the road image information representative of the road image picked up by image pickup unit 3, and determines whether or not lane-keeping controller 5 recognizes lane markers (boundaries) of a travel road on the basis of the road image information. When the determination at step S24 is negative, that is, when lane-keeping controller 5 does not recognize the lane makers of the travel road, the routine returns to step S21. When the determination at step S24 is affirmative, the routine proceeds to step S25.

At step S25, lane-keeping controller 5 calculates a curvature ρ of the lane, a displacement x of host vehicle 1 relative to the lane and a yaw angle φ of host vehicle 1, on the basis of a road image information. Further, lane-keeping controller 5 calculates a steering control command θ* which is outputted to steering control actuator 11 so that host vehicle 1 travels within the lane markers.

At step S26, lane-keeping controller 5 determines whether or not lane-keeping controller 5 receives the speed alarm information from following controller 4. When the determination at step S26 is affirmative, the routine proceeds to step S27 wherein a control condition flag F1 indicative as to whether or not a lane-keeping control is executed is set at 1 (F1=1). Thereafter, the routine returns to step S26. When the determination at step S26 is negative, the routine proceeds to step S28 wherein it is determined whether or not F=1. When the determination at step S28 is affirmative (F1=1), that is, when the lane-keeping control is put in a control stopping condition, the routine proceeds to step S29 wherein control condition flag F1 is set at 0 (F1=0). Thereafter, the routine returns to step S23. When the determination at step S28 is negative (F1=0), the routine proceeds to step S30 wherein lane-keeping controller 5 outputs the command steering control value θ* to steering control actuator 12 to execute the steering control.

At step S31, lane-keeping controller 5 calculates a necessary yaw rate $\phi_{NEED}$ on the basis of the lateral displacement X, vehicle speed detection value V and a distance L1 to a target point and the following equation (1).

$$\phi_{NEED}=(2 \cdot X \cdot V)/(L1 \cdot L1) \tag{1}$$

At step S32, lane-keeping controller 5 determines whether or not an absolute value |Δφ| of a difference Δφ between an actual yaw rate $\phi_{REAL}$ and necessary yaw rate $\phi_{NEED}$ is greater than a threshold $\phi_{TH}$ set according to vehicle speed detection value V. When the determination at step S32 is negative (|Δφ| ≦$\phi_{TH}$), lane-keeping controller 5 determines that the displacement of host vehicle 1 relative to the lane does not increase. Therefore, the routine proceeds to step S33 wherein lane-keeping controller 5 stops outputting the lane keep warning signal to lane-keeping alarm buzzer 13. When the determination at step S32 is affirmative (|Δφ|>$\phi_{TH}$), lane-keeping controller 5 determines that there is a possibility that the displacement of host vehicle 1 relative to the lane increases. Therefore, the routine proceeds to step S34 wherein lane-keeping controller 5 outputs the lane keep warning signal to lane-keeping alarm buzzer 13.

After the execution of step S33 or S34, this interruption process is terminated.

The processing of FIG. 3 corresponds to a traveling speed control means and an inter-vehicle distance control means. The processing of FIG. 4 corresponds to a traveling direction control means, and a lane-keeping control means. The processing at steps S9 and S11 in FIG. 3 corresponds to a first prior control means. The processing at steps S29 in FIG. 4 corresponds to a second prior control means. The processing at step S10 in FIG. 3 and speed-alarm buzzer 10 correspond to a speed warning means.

Next, the manner of operation of the first embodiment will be discussed hereinafter.

When the predetermined vehicle condition is satisfied and when the driver turns on the main switch and the set switch of the following control and the lane-keeping control, the speed control and the steering control are started. More specifically, during the speed control, following controller 4 controls drive control actuator 8 and brake control actuator 9 so as to bring inter-vehicle distance D closer to target inter-vehicle distance D*. Further, during the steering control, lane-keeping controller 5 detects the lane boundaries for defining a travel lane on the basis of the road image information picked up by image pickup unit 3 and controls steering control actuator 12 so as to locate host vehicle 1 within the lane markers.

Following controller 4 determines that host vehicle 1 is approaching the following object and that the speed control by means of brake control actuator 9 is unable to maintain the aimed following control, when host vehicle encounters one of the following situations 1 to 3 and when D≦Dss or ΔV≧ΔVs.

Situation 1: During the execution of the following control and the lane-keeping control, when the host vehicle is following the preceding vehicle while keeping a target inter-vehicle distance D, the preceding vehicle is decelerated by braking.

Situation 2: During the execution of the following control and the lane-keeping control, when the host vehicle is following the preceding vehicle while keeping a target inter-vehicle distance D, a vehicle traveling at a speed lower than host vehicle speed V cuts in a space between host vehicle 1 and the preceding vehicle.

Situation 3: During the execution of the following control and the lane-keeping control, when the host vehicle is following the preceding vehicle while keeping a target inter-vehicle distance D, host vehicle 1 is just entering a curved road and a preceding vehicle or an obstacle is detected.

Accordingly, when host vehicle 1 encounters one of the situations 1 to 3 is situation, if it is determined that inter-vehicle distance D is smaller than or equal to the set inter-vehicle distance Dss (D≦Dss) or that relative speed ΔV is greater than or equal to set relative speed ΔVs (ΔV≧ΔVs), host vehicle 1 is approaching the following object. That is, it is determined that the traveling speed control executed by brake control actuator 9 is put in the limit condition, and therefore following controller 4 outputs a command to speed alarm buzzer so as to generate alarm. Simultaneously, following controller 4 outputs the speed alarm information to lane-keeping controller 5.

Further, under a condition that host vehicle 1 is traveling on a curved road and that lane-keeping controller 5 controls steering control actuator 12 according to the curvature ρ of the lane boundaries which define the travel lane so that the vehicle travels within the travel lane, if lane-keeping controller 5 receives the speed alarm information from following controller 4, the routine in FIG. 4 proceeds from step S26 to step S27 wherein control condition flag F1 is set at 1 indicative of the control stopping condition. Then, the routine proceeds to step S26. Accordingly, lane-keeping controller 5 stops outputting steering control command value θ* to steering control actuator 12, and the steering control is terminated. Therefore, the generation of the steering assist torque is stopped by this termination. Accordingly, when the driver steers a steering wheel in order to avoid the approaching following-control object according to the alarm generated by speed alarm buzzer 10, the steering torque generated by steering control actuator 12 never affects the emergency steering control executed by the driver. This enables the driver to smoothly execute the emergency avoidance steering operation.

Then, when the approach of host vehicle 1 to the following control object is avoided by the deceleration control of the brake control actuator 12 and the emergency avoidance steering executed by the driver and when the normal following control is restarted, following controller 4 commands speed alarm buzzer 10 to stop generating the speed alarm and stops outputting the speed alarm information to lane-keeping controller 5. Therefore, lane-keeping controller 5 does not receive the speed alarm information from following controller 4, and the routine in FIG. 4 proceeds from step S26 to step S28. Since control condition flag F1 is set at 1 indicative of the control stop condition, the routine proceeds to step S29 wherein control condition flag F1 is set at 0 indicative of a control executing condition. Thereafter, the routine returns to step S23 wherein it is determined whether or-not the vehicle condition is satisfied.

Accordingly, steering control command value θ* is calculated on the basis of the road image information after the determinations as to the vehicle condition and the lane recognition are executed. Then, steps S26, S28 and S30 are sequentially executed. Accordingly, the condition of steering control actuator 12 is automatically returned to the condition where steering control actuator 12 receives steering control command value θ*. Therefore, the lane-keeping steering control is automatically restarted.

On the other hand, when the curvature ρ of the travel road is large and when there is a possibility that the displacement of the host vehicle relative to the lane increases, the lane-keeping alarm is generated by lane-keeping alarm buzzer 13 according to the execution of the lane-keep control process shown in FIG. 4. However, under this condition, the lane-keeping alarm information is not sent to following controller 4. Therefore, following controller 4 controls drive control actuator 8 and/or brake control actuator 9 and continues the vehicle speed control so as to bring the inter-vehicle distance D between the host vehicle and a preceding vehicle or obstacle closer to target inter-vehicle speed D*.

With the thus arranged first embodiment according to the present invention, when following controller 4 determines that the braking control by means of brake control actuator 9 cannot properly execute the speed control, following controller 4 commands the speed alarm buzzer 10 to generate the speed alarm, and simultaneously lane-keeping controller 5 stops the steering control. Accordingly, under this situation, the generation of steering force is stopped, and the following control is executed prior to the lane-keeping control. This arrangement facilitates the execution of the emergency avoidance steering operation by the driver.

Further, under the condition that the steering control by means of the steering control actuator 12 is stopped, when the sending of the speed alarm information to following controller 4 is stopped, the routine in FIG. 4 returns to step S23. Further, when the determination at step S23 is affirmative and when the determination at step S24 is affirmative, the steering control by means of steering control actuator 12 is automatically restarted. This automatic restart of the steering control eliminates the driver's work for restarting the steering control.

Figure 5:
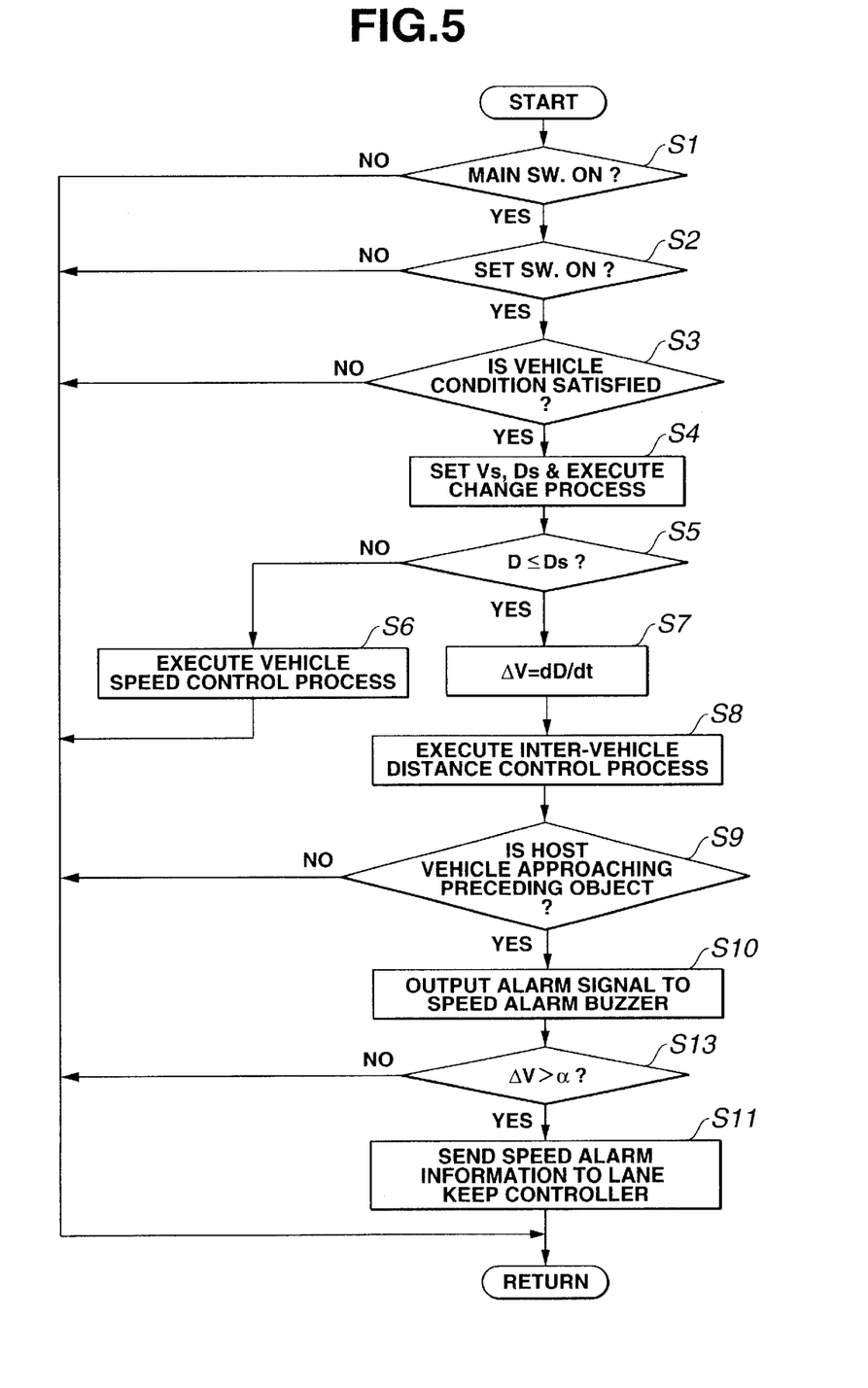
FIG. 5 is a flowchart showing a following control process executed by the following controller of a second embodiment according to the present invention.
Figure 6:
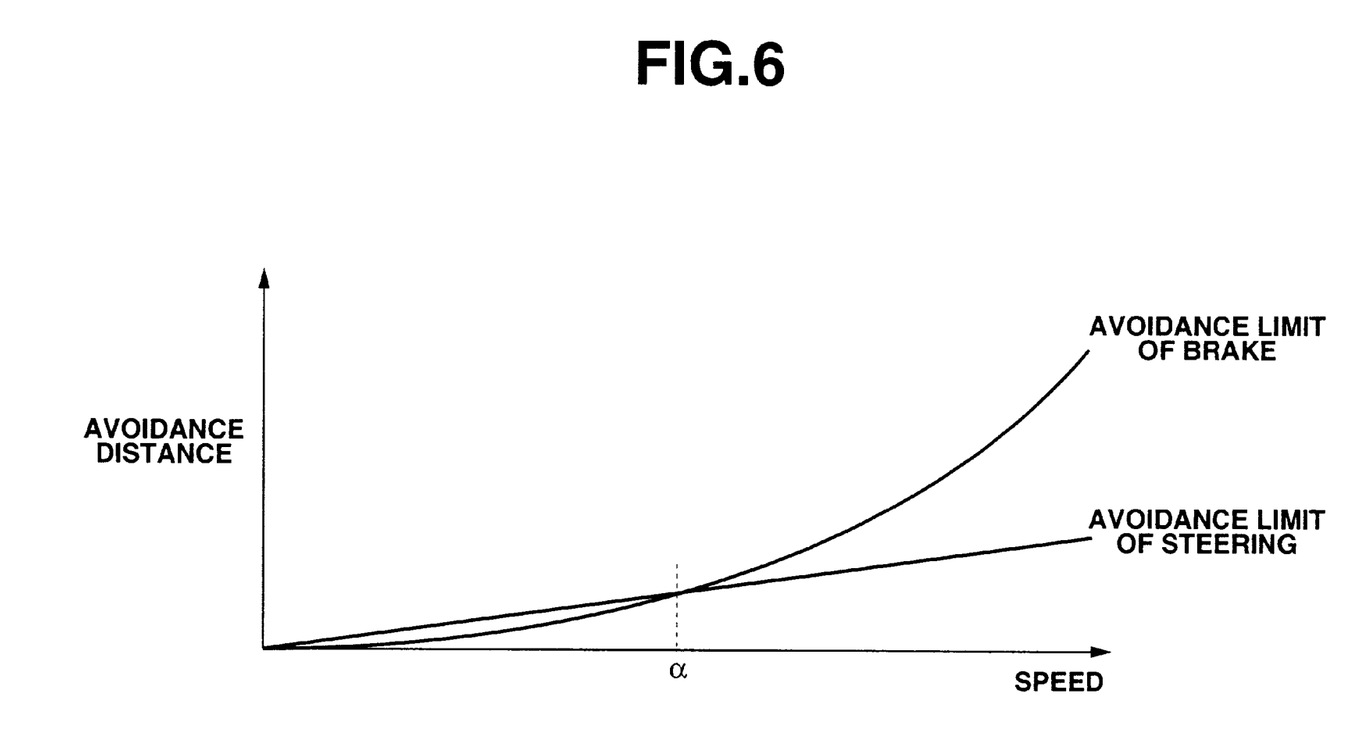
FIG. 6 is a graph showing a relationship between the vehicle speed and the avoidance distance.

Referring to FIGS. 5 and 6, there is shown a second embodiment of the vehicle traveling control system according to the present invention.

The hardware of the second embodiment is basically the same as that of the first embodiment shown in FIGS. 1 and 2. The second embodiment is particularly arranged to stop the steering control during the lane-keeping control only when the emergency avoidance steering is really required in the following control. That is, as shown in FIG. 5, the following control process executed by following controller 4 further includes step S13 between steps S10 and S11 in addition to the process of FIG. 3. At step S13, following controller 4 determines whether or not relative speed ΔV is greater than a threshold α: When the determination at step S13 is negative (ΔV≦α), it is determined that the degree of emergency against the following object is small, and the routine in FIG. 5 jumps to a return block without executing step S11. That is, the routine to terminate the present interruption process without executing step S11 wherein the speed alarm information is sent to lane-keeping controller 5 and to return to the main routine. Only when the degree of the necessity of the emergency avoidance steering is high, step S11 is executed in the second embodiment.

The other steps except for step S13 in FIG. 5 are the same as those in the flowchart of FIG. 3. The other steps are denoted by the same reference numerals in FIG. 3, and the explanation thereof is omitted herein.

With this arrangement of the second embodiment according to the present invention, when a vehicle traveling at a speed near vehicle speed V of the host vehicle 1 cuts in a place between the preceding vehicle and host vehicle 1, inter-vehicle distance D is suddenly decreased to a value smaller than the set inter-vehicle distance Dss, and following controller 4 commands speed alarm buzzer 10 to generate speed alarm. However, since relative speed ΔV relative to the cut-in vehicle is small, there is a high possibility that driver decelerates the host vehicle 1 to increase inter-vehicle distance D without executing the emergency avoidance steering. Therefore, lane-keeping controller 5 continues the steering control in such a cut-in case. This facilitates a troublesome steering operation of the driver. In-contrast to this, if host vehicle 1 employs the arrangement of the first embodiment, even when the speed alarm information is generated by the detection a slow curve of the lane, the lane-keeping control is stopped by the speed alarm information. Therefore, it is necessary that the driver executes such a troublesome steering operation under such a slow curve if host vehicle 1 employs the arrangement of the first embodiment.

On the other hand, when a vehicle cuts in a space between host vehicle 1 and a preceding vehicle and when relative speed ΔV between host vehicle 1 and the cut-in preceding vehicle is higher than threshold α, there is a high possibility that the driver executes the avoidance steering operation. Accordingly, following controller 4 outputs the speed alarm information to lane-keeping controller 5, and therefore lane-keeping controller 5 stops the steering control executed by means of steering control actuator 12. This arrangement enables the driver to smoothly execute the avoidance steering operation.

FIG. 6 shows a simplified experimental result disclosed in a preprint for a lecture of JSAE (Society of Automotive Engineers of Japan), 1999, No. 93–99, pp. 5–8. More specifically, FIG. 6 shows an avoidable distance relative to an obstacle by means of the braking operation by the driver and by means of the steering control by the driver. As is apparent from FIG. 6, when the vehicle seed is low, the braking operation is effective to avoid the obstacle. When the vehicle speed becomes greater than threshold α, the steering operation is effective as compared with the braking operations. On the basis of this experimental result, the second embodiment is arranged to execute the following control of FIG. 5 upon taking account of the experimental result shown in FIG. 6. Therefore, it becomes possible to eliminate a discomfort feeling during the emergency avoidance operation and a troublesome steering operation due to the unnecessary stopping of the steering control by steering control actuator 12.

Next, there will be discussed a third embodiment of the vehicle traveling control system according to the present invention with reference to FIGS. 7 and 8. The hardware of the third embodiment is basically the same as that of the first embodiment shown in FIGS. 1 and 2.

The third embodiment is arranged to limit the acceleration control during the following control when it is determined that there is a possibility of increasing a displacement of host vehicle 1 relative to the travel lane during the lane-keeping control process. More specifically, as shown in FIG. 7, the step S11 is eliminated as compared with the flowchart of FIG. 3. The processing at step S6 in FIG. 3 is changed into step S41 wherein set vehicle speed Vs is set as target vehicle speed V*. The processing at step S8 in FIG. 3 is changed into the processing of step S42 wherein target vehicle speed V* is set on the basis of inter-vehicle distance D and relative speed ΔV so as to bring inter-vehicle distance D closer to target inter-vehicle distance D*. Further, step S43 is newly added subsequently to the executions-of steps S41 and S10.

At step S43, following controller 4 determines whether or not vehicle speed detection value V detected by vehicle speed sensor 6 is smaller than target vehicle speed V*. When the determination at step S43 is negative (V≧V*), the routine proceeds to step S44 wherein following controller 4 calculates a driving force for deceleration and coast running on the basis of a difference ε obtained by subtracting vehicle speed detection value V from target vehicle speed V*.

At step S45 subsequent to the execution of step S44, following controller 4 calculates a target brake pressure to be applied to brake control actuator 9 on the basis of the driving force calculated at step S44.

At step S46, following controller 4 outputs the target brake pressure to brake control actuator 9 and outputs target throttle opening θ* set at 0 to drive control actuator 8. Thereafter, the routine of FIG. 3 returns to the main program.

On the other hand, when the determination at step S43 is affirmative (V<V*), following controller 4 determines that it is necessary to accelerate host vehicle 1, and therefore the routine proceeds to step S47 wherein the driving force for accelerating host vehicle 1 is calculated on the basis of the difference ε obtained by subtracting the vehicle speed detection value V from target vehicle speed V*.

At step S48 subsequent to the execution of step S47, following controller 4 determines whether or not the lane-keeping alarm information is received from lane-keeping controller 5. When the determination at step S48 is negative, the routine proceeds to step S49 wherein following controller 4 calculates target throttle opening θ* on the basis of the driving force calculated at step S47. When the determination at step S48 is affirmative, the routine returns to the main program.

At step S50 subsequent to the execution of step S49, following controller 4 outputs target throttle opening θ* calculated at step S49, and the routine returns to the main program.

The processing corresponding to that in FIG. 3 is denoted by the same reference numeral, and the explanation thereof is omitted herein.

Figure 8:
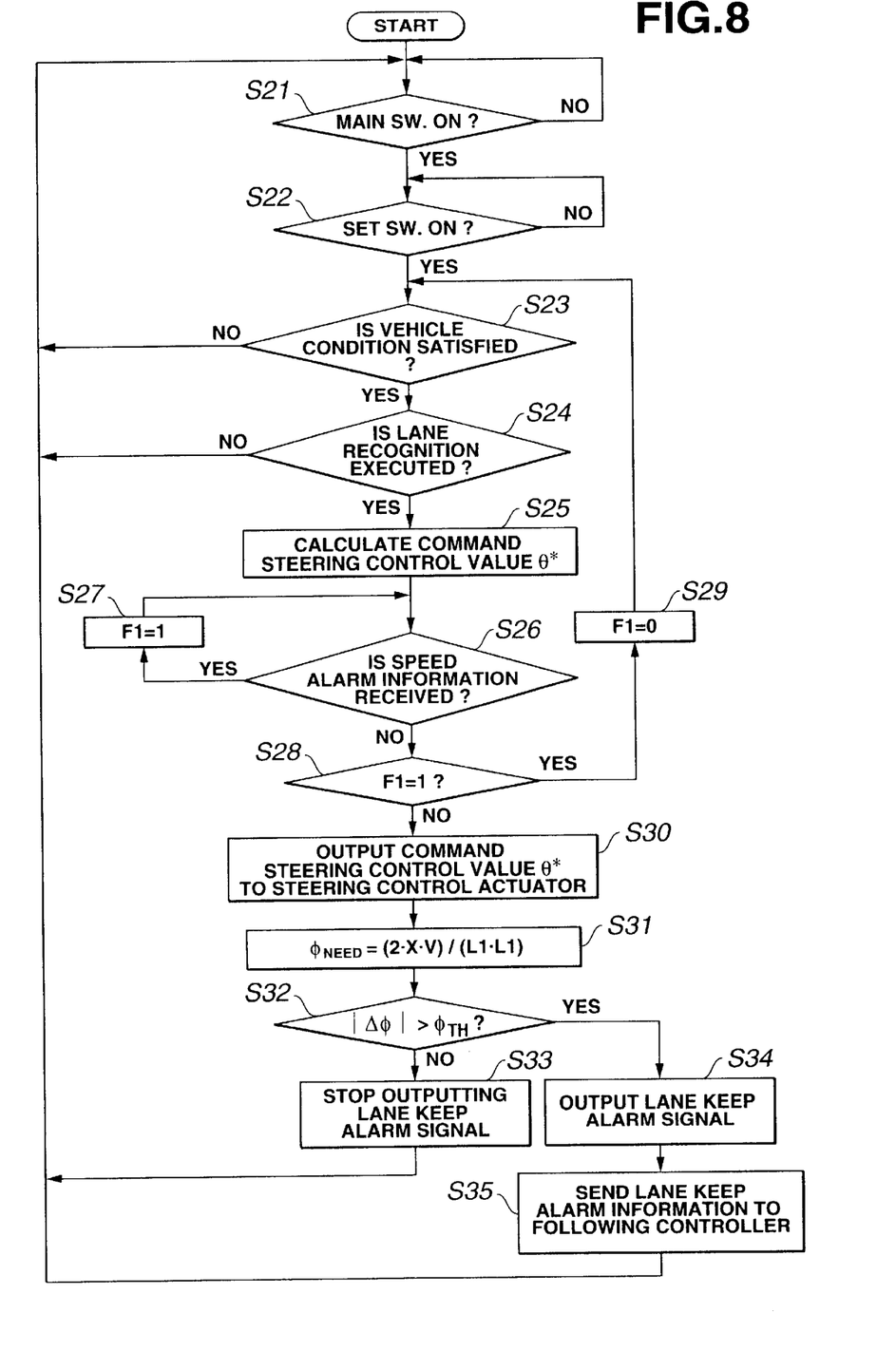
FIG. 8 is a flowchart showing a lane-keeping control process executed by a lane-keeping controller of the third embodiment.

As shown in FIG. 8, the program executed by lane-keeping controller 5 comprises step S35 subsequent to the execution of step S34. At step S35, lane-keeping controller 5 outputs the lane-keeping alarm information to following controller 4. The other steps in FIG. 8 are the same as those in FIG. 4. The other steps are denoted by the same reference numerals, and the explanation thereof is omitted herein.

With the thus arranged third embodiment according to the present invention, when host vehicle 1 starts turning a sharp curve during the lane-keeping control and when the absolute value |Δφ| of a difference between the necessary yaw rate $\phi_{NEED}$ and the actual yaw rate $\phi_{REAL}$ is greater than threshold $\phi_{TH}$, the routine of FIG. 8 proceeds from step S32 to step S34 wherein lane-keeping controller 5 outputs the lane-keep alarm signal to lane-keeping alarm buzzer 13 so as to generate the lane-keeping alarm. Simultaneously, lane-keeping controller 5 outputs the lane-keeping alarm information to following controller 4.

Figure 7:
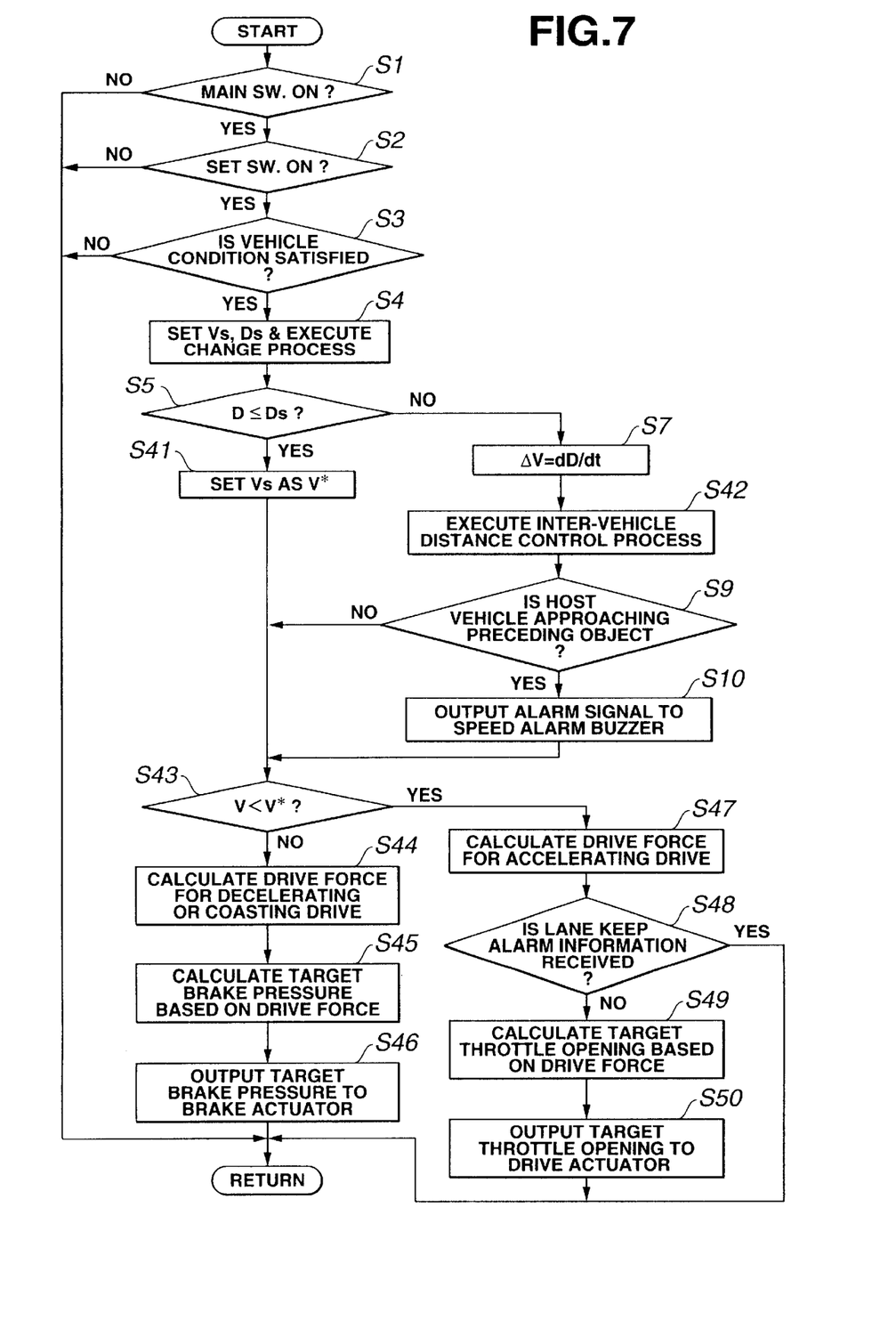
FIG. 7 is a flowchart showing a following control process executed by the following controller of a first embodiment according to the present invention.

When following controller 4 receives the lane-keeping alarm information from lane-keeping controller 5 and when vehicle speed detection value V is greater than set vehicle speed Vs under a condition that there is no following object or when target vehicle speed V* becomes smaller than vehicle speed detection value V due to shortening of inter-vehicle distance D as compared with target inter-vehicle distance D* (D<D*) under a condition that there is a following object ahead of host vehicle 1, the routine of FIG. 7 proceeds from step S43 to step S44 wherein following controller 4 calculates the driving force for decelerating and coast traveling of host vehicle 1 on the basis of vehicle speed difference ε. Further, following controller 4 calculates the target brake pressure on the basis of the driving force and outputs the target brake pressure to brake control actuator 9 so as to generate the braking force. Further, following controller 4 sets target throttle opening θ* at zero and outputs the set target throttle opening θ* to drive control actuator 8 to execute the coast traveling control.

However, when following controller 4 receives the lane-keeping alarm information and when target vehicle speed V* is set at a value greater than vehicle speed detection value V because distance sensor 2 loses a sight of a preceding vehicle, the routine of FIG. 7 proceeds from step S43 to step S47 wherein the driving force for accelerating host vehicle 1 is calculated on the basis of the vehicle speed difference ε. However, the following controller 4 has received the lane keeping alarm information when the routine proceeds to step S48. Accordingly, the routine proceeds from step S48 to the return block without executing step S49. That is, since target throttle opening θ* is not calculated, the acceleration operation is forbidden in the following control process.

Accordingly, when lane-keeping controller 5 generates the lane-keeping alarm information because the displacement of the host vehicle relative to the lane tends to increase, following controller 4 forbids the acceleration control and executes only the deceleration control or coast traveling control. Therefore, when host vehicle 1 follows a preceding vehicle and when following controller 4 loses the sight of the preceding vehicle at a relatively sharp curve, only the deceleration control is executed. This arrangement prevents a driver from causing a strange feeling in the vehicle behavior. Further, such a deceleration control decreases the rate of change of the displacement of host vehicle 1 relative to the lane and facilitates the driver intervention to the steering operation.

Next, there will be discussed a fourth embodiment according to the present invention with reference to FIG. 9. The hardware of the fourth embodiment is basically the same as that of the first embodiment shown in FIGS. 1 and 2.

The fourth embodiment according to the present invention is arranged so that following controller 4 positively executes the decelerating control when lane-keeping controller 5 generates the lane-keeping alarm. More specifically, following controller 4 executes the following control process shown in FIG. 9. The following control process of FIG. 9 comprises steps S51 and S52 instead of steps S47 and S48 in FIG. 7. Step S51 is executed subsequently to the affirmative determination (V<V*) at step S43. At step S51, following controller 4 determines whether or not following controller 4 receives the lane-keeping alarm information from lane-keeping controller 5. When the determination at step S52 is affirmative, the routine proceeds to step S44. When the determination at step S51 is negative, the routine proceeds to step S52. At step S52, following controller 4 calculates the driving force for accelerating host vehicle 1. After the execution of step S52, the routine of FIG. 9 proceeds to step S49.

Figure 9:
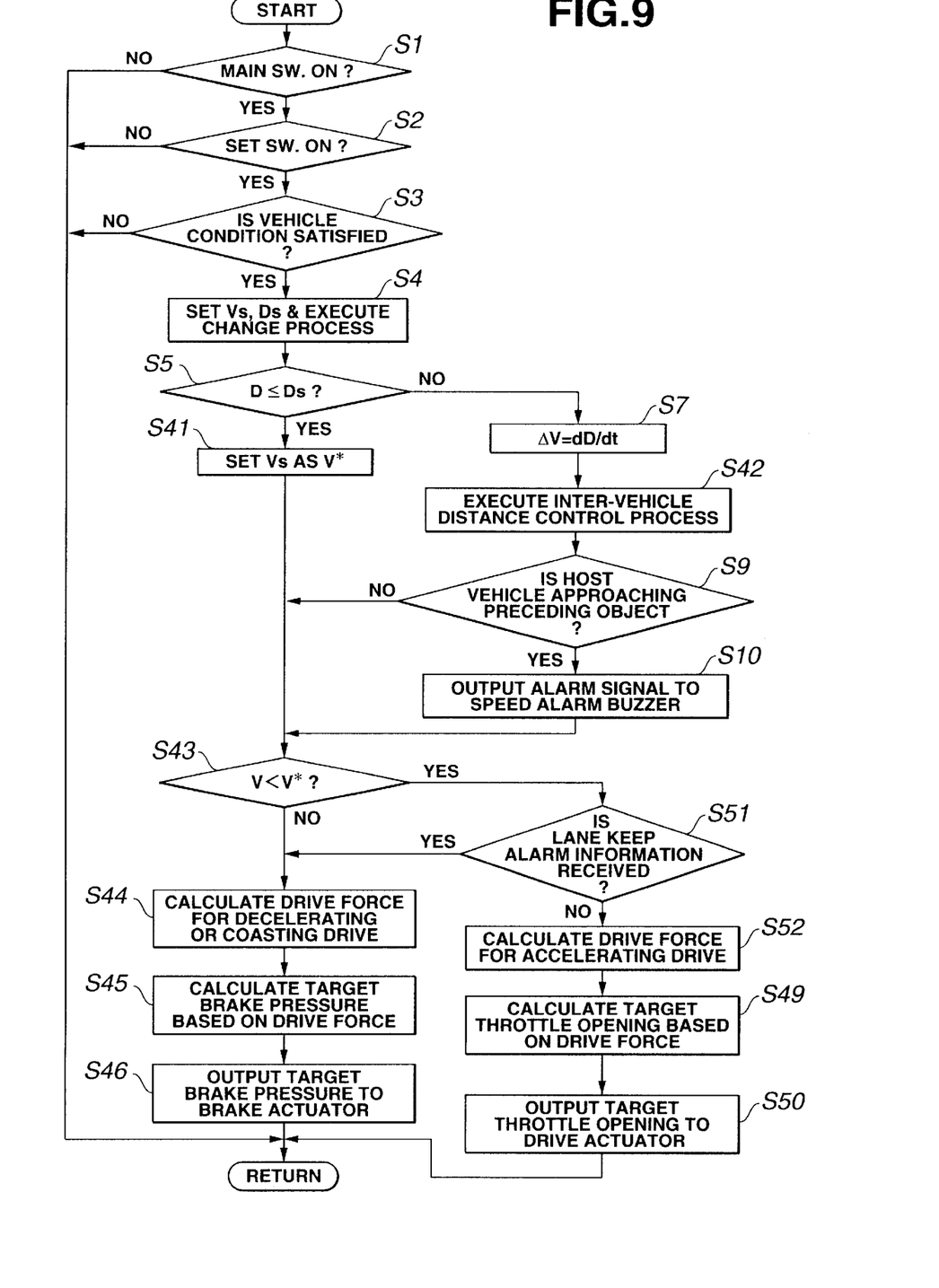
FIG. 9 is a flowchart showing a following control process executed by the following controller of a fourth embodiment according to the present invention.

The other steps in FIG. 9 are the same as those in FIG. 7. The other steps are denoted by the same reference numerals in FIG. 9 and the explanation thereof is omitted herein.

With the thus arranged fourth embodiment according to the present invention, when following controller 4 receives the lane-keeping alarm information and when vehicle speed detection value V is greater than or equal to target vehicle speed V* (V≧V*), the routine proceeds from step S43 to step S44 wherein the deceleration control and the coast traveling control are executed. Further, when following controller 4 receives the lane-keeping alarm information and when vehicle speed detection value V is smaller than target vehicle speed V* (V<V*), the routine proceeds from step S44 through step S51 to S44, so that the deceleration control and the coast traveling control are also executed. That is, when following controller 4 receives the lane-keeping alarm information, following controller 4 positively executes the deceleration control so as to decrease the rate of change of the displacement of the host vehicle relative to the lane regardless the vehicle speed detection value V. This arrangement facilitates the driver intervention in the steering operation under such a condition.

Next, there will be discussed a fifth embodiment according to the present invention with reference to FIGS. 10 and 11. The hardware of the fifth embodiment is basically the same as that of the first embodiment shown in FIGS. 1 and 2.

The fifth embodiment is arranged such that when the host vehicle is put in a condition that lane-keeping controller 5 generates the lane-keeping alarm, lane-keeping controller 5 calculates a target vehicle speed V* for decreasing the rate of change of the displacement of host vehicle 1 relative to the lane and sends the calculated target vehicle speed V* to following controller 4. This is intended to firmly decrease the rate of change of the displacement of host vehicle 1 relative to the lane.

Figure 10:
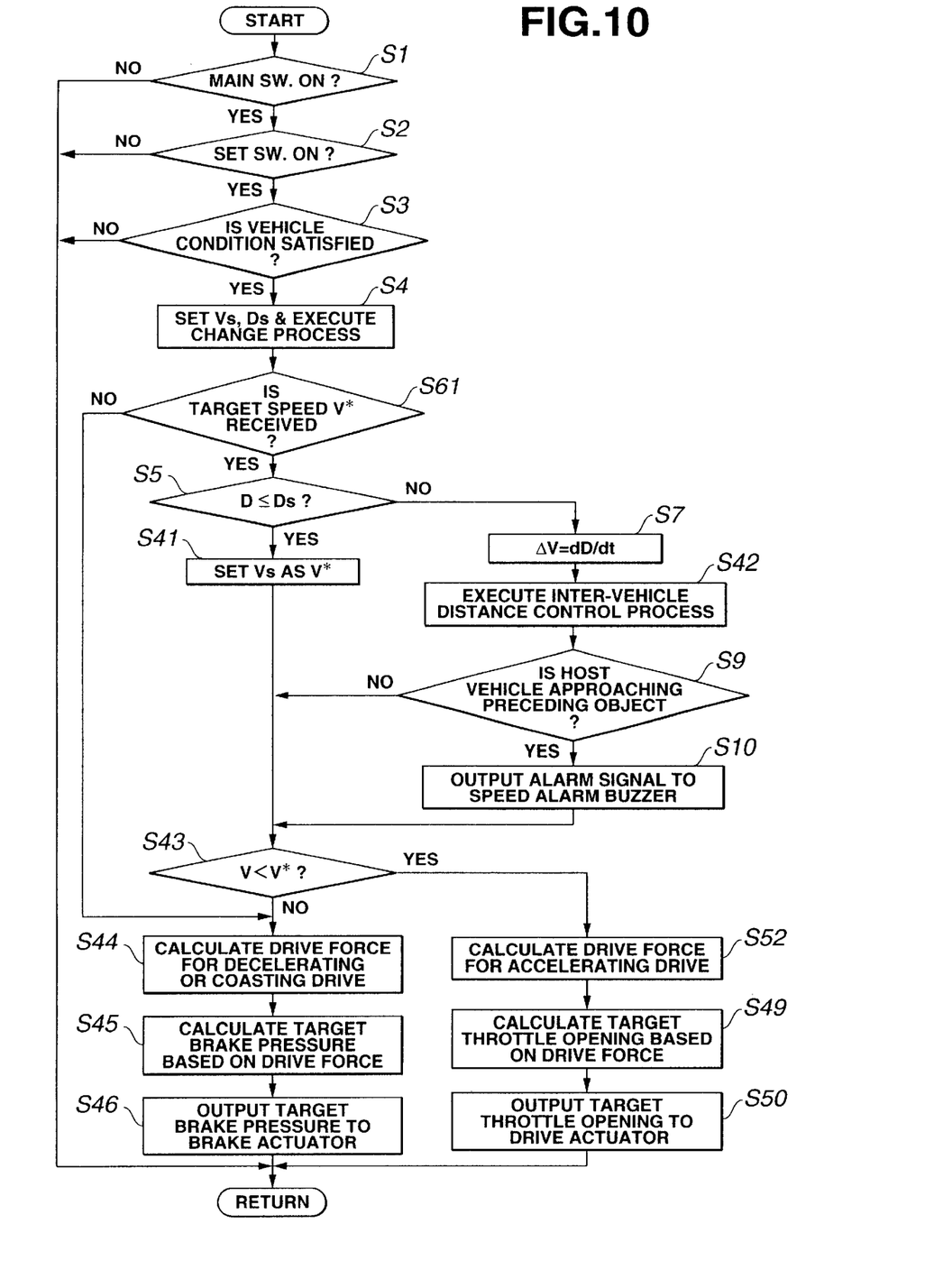
FIG. 10 is a flowchart showing a following control process executed by the following controller of a fifth embodiment according to the present invention.

More specifically, following controller 4 executes the following control process shown in FIG. 10.

In the flowchart shown in FIG. 10, step S51 is eliminated from the process of FIG. 9, and step S61 is newly added between steps S4 and S5. Accordingly, when the determination at step S43 is affirmative, the routine directly proceeds to step S52. After the execution of step S4, following controller 4 determines whether or not target vehicle speed V* is received from lane-keeping controller 5. When the determination at step S61 is affirmative, the routine proceeds to step S5. When the determination at step S61 is negative, the routine proceeds to step S44. The other steps in FIG. 10 are the same as those in FIG. 9. The other steps are denoted by the same reference numerals in FIG. 9 and the explanation thereof is omitted herein.

Figure 11:
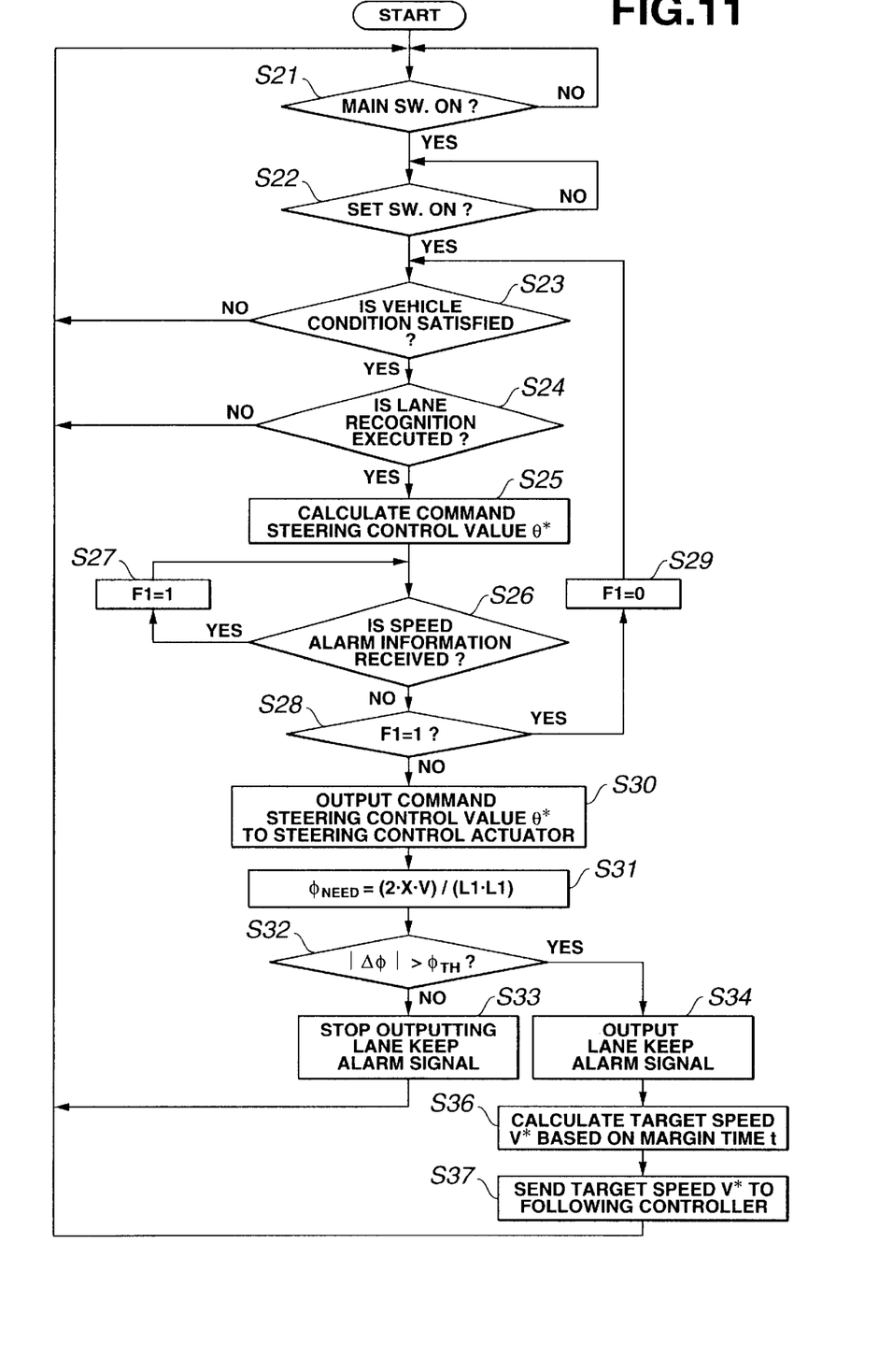
FIG. 11 is a flowchart showing a lane-keeping control process executed by the lane-keeping controller of the fifth embodiment.

On the other hand, lane-keeping controller 5 of the fifth embodiment executes the lane-keeping control process shown in FIG. 11.

In the flowchart of FIG. 11, step S35 is eliminated from the process of FIG. 8, and steps S36 and S37 are newly added after step S34. At step S36, lane-keeping controller 5 calculates target vehicle speed V* to ensure the necessary margin time, on the basis of an upper limit L of the displacement of host vehicle 1 relative to the lane and a preset margin time t. Further, at step S37, lane-keeping controller 5 sends the calculated target vehicle speed V* to following controller 4. Accordingly, when the determination at step S43 is affirmative, the routine directly proceeds to step S52. The other steps in FIG. 11 are the same as those in FIG. 8. The other steps are denoted by the same reference numerals in FIG. 8 and the explanation thereof is omitted herein.

With the thus arranged fifth embodiment, when lane-keeping controller 5 is executing the lane-keeping control and when the displacement of the host vehicle relative to the lane is increased by traveling a sharp curve, lane-keeping controller 5 outputs the lane-keep alarm signal to lane-keeping alarm buzzer 13 to generate the lane-keeping alarm. Simultaneously, lane-keeping controller 5 calculates target vehicle speed V* so as to ensure margin time t during which the driver can execute the steering operation before the displacement of the host vehicle relative to the lane reaches the upper limit value L. Further, lane-keeping controller 5 outputs target vehicle speed V* to following controller 4.

When following controller 4 receives target vehicle speed V* from lane-keeping controller 5, the routine of FIG. 10 proceeds from step S61 to step S44. Accordingly, following controller 4 calculates the driving force for decelerating host vehicle 1 and for executing the coast traveling on the basis of difference ε between target vehicle speed V* and vehicle speed detection value V. Further, following controller 4 calculates the target brake pressure on the basis of the calculated driving force and outputs the calculated target brake pressure to brake control actuator 9. This arrangement firmly ensures margin time t which is necessary to lower the rate of change of the displacement of the host vehicle relative to the lane regardless the vehicle speed detection value V. Accordingly, the driver can easily execute the steering operation under this condition.

Although the preferred embodiments according to the present invention have been shown and described such that following controller 4 executes the following control, it will be understood that the present invention is not limited to this and may be arranged so as to detect an obstacle on the road on the basis of inter-vehicle distance D detected by distance sensor 2 and to execute the deceleration control when the obstacle is detected.

Further, while the preferred embodiments according to the present invention have be shown and described so as to be adapted to a vehicle driven by an internal combustion engine, it will be understood that the present invention is not limited to this and may be adapted to an electric vehicle driven by an electric motor or a hybrid vehicle employing an internal combustion engine and an electric motor. When a vehicle with an electric motor is employed, the decelerating control by means of a regenerative braking may be employed together with the acceleration and deceleration control executed by controlling a drive current of the electric motor.

This application is based on a prior Japanese Patent Application No. 2000-401668 filed on Dec. 28, 2000 in Japan. The entire contents of this Japanese Patent Application No. 2000-401668 are hereby incorporated by reference.

Although the invention has been described above by reference to a certain embodiment of the invention, the invention is not limited to the embodiments described above. Modifications and variations of the embodiments described above will occur to those skilled in the art, in light of the above teaching. The scope of the invention is defined with reference to the following claims.

What is claimed is:

1. A vehicle traveling control system of a host vehicle comprising:
    a following controller executing a following control for controlling an inter-vehicle distance between the host vehicle and a following object ahead of the host vehicle; and
    a lane-keeping controller coupled with the following controller, the lane-keeping controller executing a steering control for steering the host vehicle so as to locate the host vehicle within a lane traveled by the host vehicle;
    wherein a control condition of one of the following control and the steering control is changed according to the control condition of the other of the following control and the steering control; and
    wherein the following controller outputs a speed alarm when a deceleration control of the following control is unable to maintain a target inter-vehicle distance between the host vehicle and a preceding vehicle ahead of the host vehicle, and the lane-keeping controller outputs a lane-keeping alarm when there is a tendency to increase a rate of change of a displacement of the host vehicle relative to the lane.

2. The vehicle traveling control system as claimed in claim 1, wherein the following controller outputs a speed alarm when the following control is unable to maintain a target inter-vehicle distance, and the lane-keeping controller outputs a lane-keeping alarm when the steering control is unable to maintain a traveling of the host vehicle within the lane.

3. The vehicle traveling control system as claimed in claim 1, wherein the lane-keeping controller stops the steering control when the following controller outputs the speed alarm.

4. The vehicle traveling control system as claimed in claim 1, wherein the lane-keeping controller stops the steering control when the following controller outputs the speed alarm and when a relative speed between the host vehicle and a preceding object ahead of the host vehicle is greater than or equal to a predetermined value.

5. The vehicle traveling control system as claimed in claim 1, wherein when the lane-keeping controller was put in an operating condition before the following controller outputs the speed alarm, the lane-keeping controller is put in the operating condition after the following controller stops generating the speed alarm.

6. The vehicle traveling control system as claimed in claim 1, wherein the following controller prohibits a vehicle acceleration control of the following control when the lane-keeping controller outputs the lane-keeping alarm.

7. The vehicle traveling control system as claimed in claim 1, wherein the following controller executes a vehicle deceleration control of the following control when the lane-keeping controller outputs the lane-keeping alarm.

8. The vehicle traveling control system as claimed in claim 1, wherein the following controller executes a vehicle deceleration control of the following control so that a rate of change of a displacement of the host vehicle relative to the lane becomes smaller than a predetermined value when the lane-keeping controller outputs the lane-keeping alarm.

9. The vehicle traveling control system as claimed in claim 1, wherein when lane-keeping controller outputs the lane-keeping alarm, the lane-keeping controller calculates a target vehicle speed for decreasing the rate of change of the displacement of the host vehicle relative to the lane and sends the calculated target vehicle speed to the following controller, and the following controller executes the following control on the basis of the target vehicle speed sent from the lane-keeping controller.

10. A method of controlling a traveling of a host vehicle, comprising:
    executing a following control for controlling an inter-vehicle distance between the host vehicle and a following object ahead of the host vehicle;
    executing a steering control for steering the host vehicle so as to locate the host vehicle within a lane traveled by the host vehicle; and
    changing a control condition of one of the following control and the steering control according to the control condition of the other of the following control and the steering control;
    outputting a speed alarm when a deceleration control of the following control is unable to maintain a target inter-vehicle distance between the host vehicle and a preceding vehicle ahead of the host vehicle; and
    outputting a lane-keeping alarm when there is a tendency to increase a rate of change of a displacement of the host vehicle relative to the lane.

11. A vehicle traveling control system comprising:
    traveling speed control means for controlling a traveling speed of a host vehicle;
    traveling direction control means for controlling a traveling direction of the host vehicle;
    first anteceding means for anteceding the control executed by the traveling speed control means prior to the control executed by the traveling direction control means;
    second anteceding means for anteceding the control executed by the traveling direction control means prior to the control by the traveling speed control means;
    priority determining means for determining a priority between the first anteceding means and the second anteceding means according to a traveling condition of the host vehicle; and
    priority executing means for executing one of the first anteceding means and the second anteceding means according to the determination of the priority determining means.

12. A vehicle traveling control system comprising:
    inter-vehicle distance control means for executing a following control for controlling an inter-vehicle distance between a host vehicle and a following object ahead of the host vehicle;

lane-keeping control means for executing a steering operation so as to locate the host vehicle within a lane;

cooperative control means for changing a control condition of one of the inter-vehicle distance control means and the lane-keeping control means according to a control condition of the other of the inter-vehicle distance control means and the lane-keeping control means;

speed alarm outputting means for outputting a speed alarm when a deceleration control of the following control is unable to maintain a target inter-vehicle distance between the host vehicle and a preceding vehicle ahead of the host vehicle; and lane-keeping alarm outputting means for outputting a lane-keeping alarm when there is a tendency to increase a rate of change of a displacement of the host vehicle relative to the lane.

* * * * *